United States Patent [19]
Horen et al.

[11] Patent Number: 5,483,476
[45] Date of Patent: Jan. 9, 1996

[54] MANTISSA ADDITION SYSTEM FOR A FLOATING POINT ADDER

[75] Inventors: Yoram Horen, Rehovot; Yehuda Volpert, Petach-Tikya; Alick Einav, Nathanya, all of Israel

[73] Assignee: Motorola Inc., Schaumburg, Ill.

[21] Appl. No.: 186,724

[22] Filed: Jan. 26, 1994

[30] Foreign Application Priority Data

Jan. 30, 1993 [GB] United Kingdom ............... 9301863

[51] Int. Cl.$^6$ .................................................. G06F 7/38
[52] U.S. Cl. .................................................. 364/748
[58] Field of Search .................................... 364/748

[56] References Cited

U.S. PATENT DOCUMENTS

| | | | |
|---|---|---|---|
| 4,488,252 | 12/1984 | Vassar | 364/748 |
| 4,562,553 | 12/1985 | Mattedi et al. | 364/748 |
| 4,592,006 | 5/1986 | Hagiwara et al. | 364/748 |
| 5,303,175 | 4/1994 | Suzuki | 364/748 |

FOREIGN PATENT DOCUMENTS 2116758  9/1983  United Kingdom .

*Primary Examiner*—Tan V. Mai

[57] ABSTRACT

A mantissa addition system (2) having a mantissa adder (6) for adding two mantissas provides an addition result a plurality of bits arranged in sub-groups. The mantissa addition system also has a flag generator which generates a flag for each sub-group: each flag having an active state when all the bits in the respective sub-group are zero and an inactive state when at least one of the bits in the respective sub-group is non-zero. A first detector (46) determines the most significant flag that has the inactive state and provides a first control signal representative of the detected most significant flag. A first shifter (40) shifts the groups of bits of the addition result in response to the first control signal so that the sub-group of bits corresponding to the detected most significant flag is the most significant group. A second detector (48) detects the most significant bit of the most significant sub-group of the shifted result that is non-zero and provides a second control signal representative of the detected most significant bit. A second shifter (42) shifts the plurality of bits of the shifted result in response to the second control signal so that the detected most significant non-zero bit is the most significant bit. The output (8) of the second shifter represents the normalised addition result. The shift information (N) is generated by logic means (52, 54) from the first and second control signals.

8 Claims, 3 Drawing Sheets

5,483,476

MANTISSA ADDITION SYSTEM FOR A FLOATING POINT ADDER

FIELD OF THE INVENTION

This invention relates to floating point adders and more particularly relates to a mantissa addition system of a floating point adder.

BACKGROUND OF THE INVENTION

Floating point numbers comprise a mantissa part and an exponent part and are usually 32-bit ('single precision') or 64-bit ('double precision') in size. The formats of floating point numbers depend on the standard implemented. For example, the widely implemented IEEE standard has the format $1.\text{fff} \times 2^e$ where 1.fff is the normalised mantissa and e is the exponent.

A floating point addition operation (which may be a subtract operation depending on the sign of the floating point number(s)) for two floating point numbers typically comprises the following steps:

1). Calculate the difference between the two exponents.

2). Shift the mantissa of the smaller operand right by the absolute value of the exponent difference.

3). Add the two mantissas.

4). Normalise the addition result— a) Find the leading 'one' ('1') bit of the mantissa's addition result: (result of step 3).

b) Shift the mantissa's addition result to the left to discard all the leading zeros until the leading '1' bit becomes the Most Significant Bit (MSB) of the result (in case of subtract operation).

c) Encode the number of left shifts required to a binary value for updating the exponent result.

d) Subtract the binary value from the exponent value in order to correct the result of the floating point operand.

5). Result rounding—If needed, add 1 to the result.

6). Calculate the exception flags according to the final result.

When implementing such a sequence in an adder, it is important that the delay in the critical path between the input and output of the adder is kept to a minimum. Generally, the 'find leading one' step is performed serially. This serial execution, combined with the 'shifting of the result step', takes a significant amount of time in the critical path which may be unacceptable in some applications.

There is therefore a need to provide an improved mantissa addition system which performs fast normalisation of the mantissa adder's result.

SUMMARY OF THE INVENTION

In accordance with the invention there is provided a mantissa addition system for providing a normalised addition result for two mantissas and information indicating the number of bit shifts required to provide the normalised addition result, the system comprising:

mantissa adder means for adding two mantissas to provide an addition result, the addition result comprising a plurality of bits arranged in a predetermined number of sub-groups of bits;

flag generating means for generating a flag for each sub-group, each flag having an active state when all the bits in the respective sub-group are zero and an inactive state when at least one of the bits in the respective sub-group is non-zero;

mantissa normalisation means coupled to the mantissa adder means and the flag generating means, the mantissa normalisation means comprising:

first detecting means for detecting the most significant flag having the inactive state and for providing a first control signal representative of the detected most significant flag;

first shifting means for shifting the groups of bits of the addition result in response to the first control signal so that the sub-group of bits corresponding to the detected most significant flag is the most significant group, the first shifting means providing a first shifted addition result;

second detecting means for detecting the most significant bit of the most significant sub-group of the first shifted addition result which is non-zero anti for providing a second control signal representative of the detected most significant bit;

second shifting means for shifting the plurality of bits of the first shifted addition result in response to the second control signal so that the detected most significant non-zero bit is the most significant bit, the second shifting means providing a second shifted addition result which represents the normalised addition result; and logic means for providing the shift information in dependence on the number of shifts performed by the first and second shifting means.

An advantage of this arrangement is that the controls which are used to normalise the mantissa are generated concurrently with the generation of the addition result. This ensures that the delay in the floating point adder's critical path is reduced. Furthermore, the encoding of the control signals to the shift information is simple and fast.

BRIEF DESCRIPTION OF THE DRAWINGS

A mantissa addition system in accordance with the invention will now be described, by way of example only, with reference to the accompanying drawings in which.

DETAILED DESCRIPTION OF THE DRAWINGS

The present invention will be described hereinafter with reference to the IEEE double-precision format. It will be appreciated, however, that the invention is not limited to this format and that the invention may be implemented with other floating point number formats, such as the single-precision format.

The double-precision format has one sign bit (1), eleven exponent bits (2:12) and fifty-two fraction bits (13:64).

Figure 1:
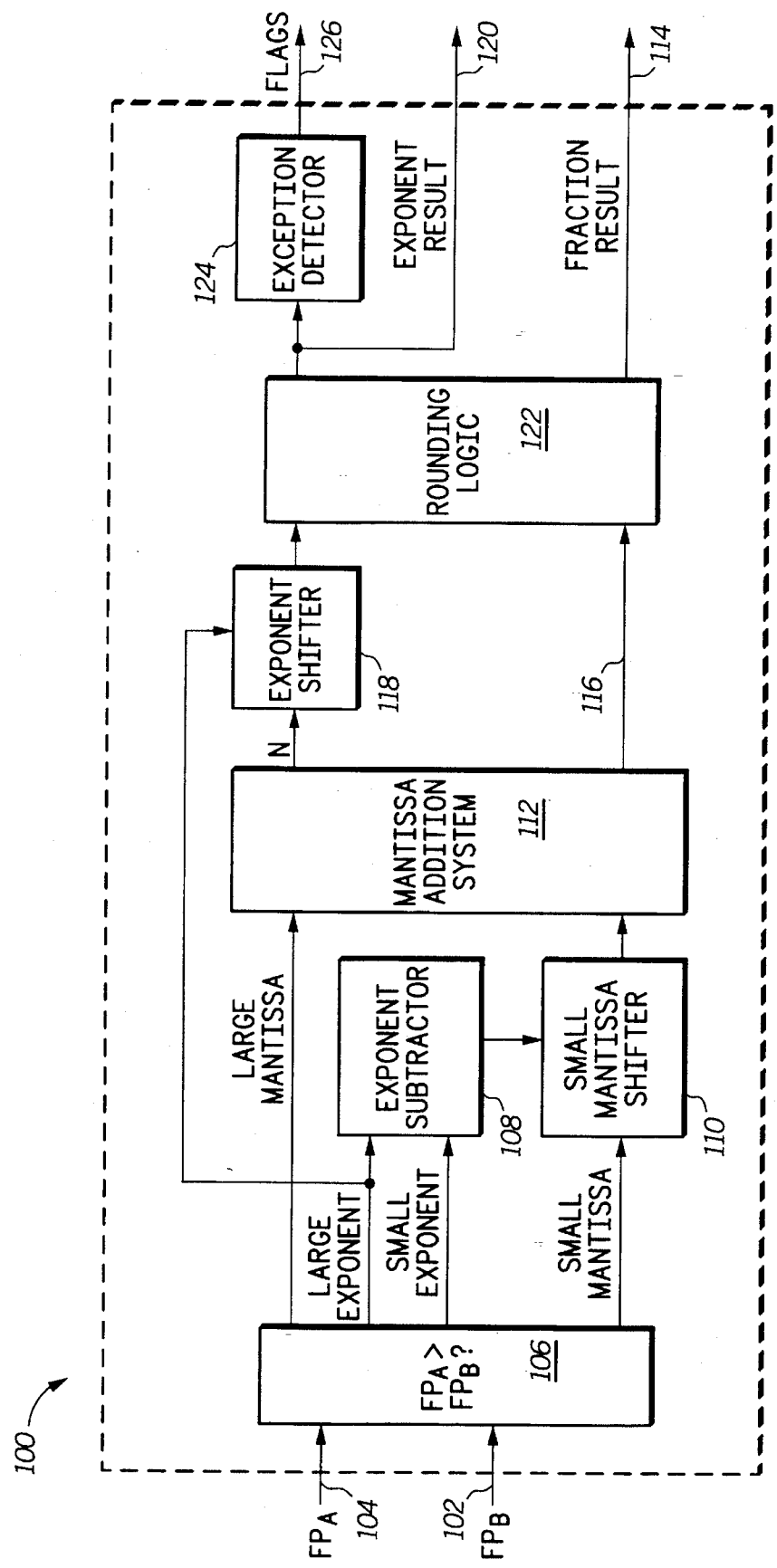
FIG. 1 shows a simplified block schematic diagram of a floating point adder incorporating a mantissa addition system in accordance with the present invention.

Referring firstly to FIG. 1, a floating point adder 100 which utilises a mantissa addition system in accordance with the present invention comprises two inputs 102 and 104 for receiving two floating point numbers $FP_A$ and $FP_B$. The inputs 102 and 104 are coupled to a circuit 106 which determines which one of the two floating point numbers $FP_A$ and $FP_B$ is the smaller. Circuit 106 provides four outputs: the mantissas of the greater and smaller floating point numbers, and the exponents of the greater and smaller floating point numbers. The difference between the two exponents is calculated in exponent subtractor 108 and the result is passed to the smaller mantissa shifter 110. The smaller mantissa shifter 110 shifts the smaller mantissa right by the absolute value of the exponent difference. The shifted result is then passed to the mantissa addition system 112 in accordance with the invention. A preferred embodiment of the mantissa addition system 112 will be described in detail below with reference to FIGS. 2 and 3.

The mantissa addition system 112 adds the greater mantissa with the shifted smaller mantissa and provides a normalised mantissa at an output 116. The mantissa addition system 112 also provides exponent shift information in the form of a binary value N to an exponent shifter 118. The exponent shifter 118 shifts the greater exponent left according to the binary value N so as to update the exponent result. The exponent result and the normalised mantissa are coupled to rounding logic 122. Rounding logic 122 adds '1' to the exponent result and normalised mantissa if the normalised mantissa comprises all '1's and provides the fraction result and exponent result at outputs 114 and 120 respectively of the floating point adder 100. An exception detector 124 checks the exponent result to ensure that it lies within a predetermined range: if the exponent result if not in the predetermined range, the exception detector 124 generates exception flags at an output 126 of the floating point adder 100.

Figure 2:
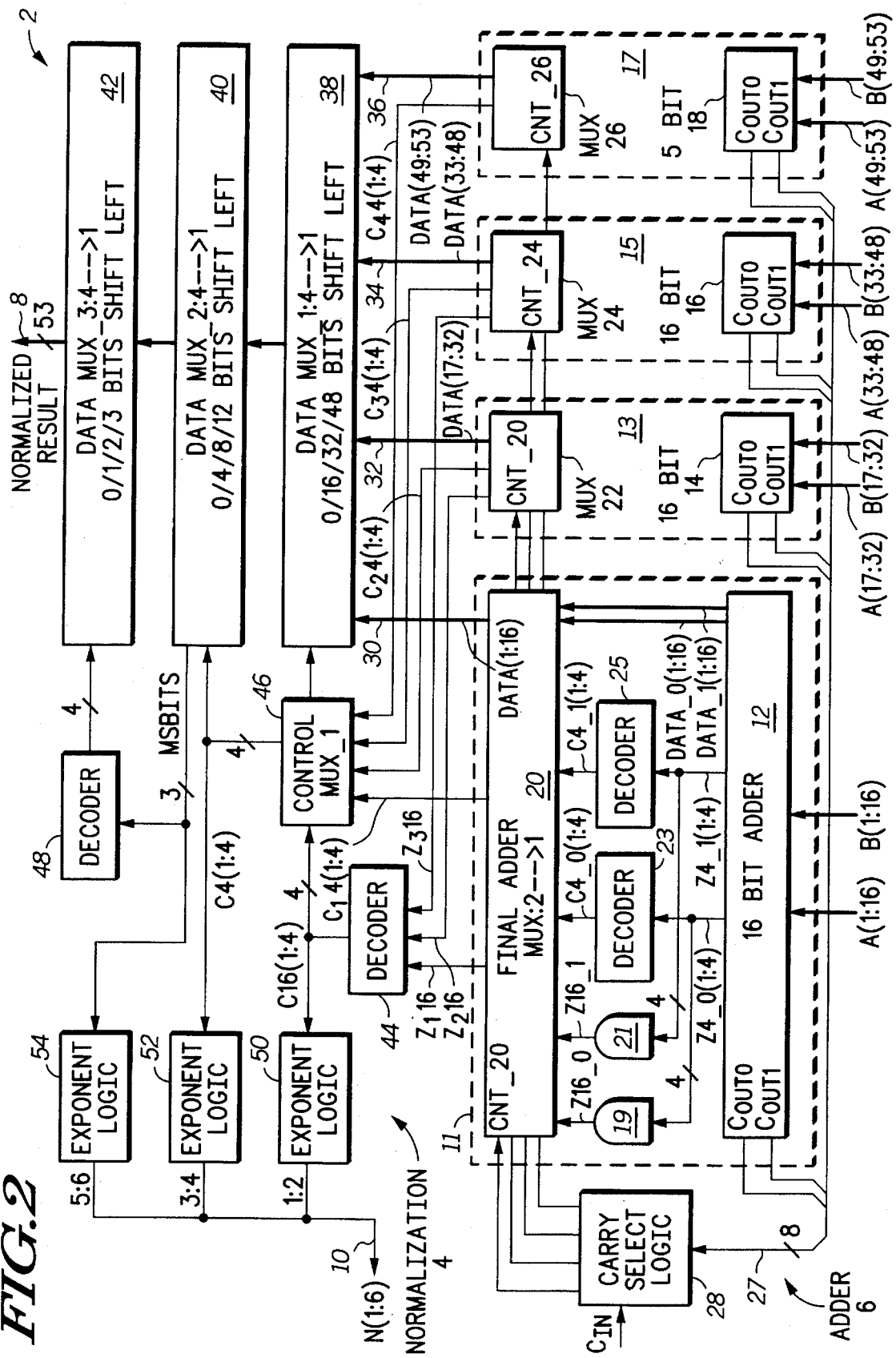
FIG. 2 shows a block schematic diagram of the mantissa addition system in accordance with the present invention.

Referring now to FIG. 2, a mantissa addition system 2 in accordance with a preferred embodiment of the invention comprises an adder part 6, which adds two mantissas (A and B) together, and a normalisation part 4, which normalises the addition result generated by the adder part 6, so as to provide a normalised result at a first output 8 and a 6-bit binary value N[1:6] at a second output 10. The binary value N is then used to correct the resulting exponent in exponent shifter 118 of FIG. 1.

The adder part 6 is implemented as a carry select adder and comprises four adder units 11, 13, 15 and 17 and carry select logic 28. The Most Significant Bits (MSBs) of the two mantissas A(1:16) and B(1:16) are coupled to the first adder unit 11, bits A(17:32) and B(17:32) are coupled to the second adder unit 13, bits A(33:48) and B(33:48) are coupled to the third adder unit 15 and bits A(49:53) and B(49:53) are coupled to the fourth adder unit 17.

The first adder unit 11 comprises a 16-bit adder 12 having two carry outputs $C_{out0}$ and $C_{out1}$, first and second 16-bit data outputs data_0 and data_1, and two groups of 4-bit zero flags Z4_0(1:4) and Z4_1(1:4). The carry outputs $C_{out0}$ and $C_{out1}$, are coupled to the carry select logic via a 8-bit bus 27. The first and second data outputs data_0 and data_1, are fed to a final adder multiplexer 20. Each group of 4-bit zero flags Z4_0(1:4) and Z4_1(1:4) is coupled to a respective decoder 23 and 25. The outputs C4_0(1:4) and C4_1(1:4) of the decoders 23 and 25 are coupled to the final adder multiplexer 20. In addition, each group of 4-bit zero flags Z4_0(1:4) and Z4_1(1:4) are ANDed together in respective AND gates 19 and 21. The output flags Z16_0 and Z16_1 of the AND gates 19 and 21 respectively are also fed to the final adder multiplexer 20. The final adder multiplexer 20 of the first adder unit 11 has a 16-bit data output 30 (hereinafter referred to as the first data output), a 4-bit control signal $C_1 4(1:4)$ output (hereinafter referred to as the first control signal output) and a flag output $Z_1 16$ (hereinafter referred to as the first flag output).

The second and third adder units 13 and 15 are identical to adder unit 11; each of the adder units 13 and 15 comprises a 16-bit adder (14 and 16 respectively) having carry outputs $C_{out0}$ and $C_{out1}$, coupled to the 8-bit bus 27 and a final adder multiplexer (22 and 24 respectively) having a 16-bit data output (hereinafter referred to as the second data output 32 and the third data output 34, respectively), a 4-bit control signal output (hereinafter refer to as the second control signal $C_2 4(1:4)$ output and third control signal $C_3 4(1:4)$ output respectively) and a flag output (hereinafter referred to as the second flag output $Z_2 16$ and third flag output $Z_3 16$ respectively).

Fourth adder unit 17 comprises a 5-bit adder 18 having carry outputs $C_{out0}$ and $C_{out1}$ coupled to the 8-bit bus 27 and a final adder multiplexer 26. The 5-bit adder 18 generates two 5-bit addition results for the two cases of $C_{in}= 0$ and $C_{in}= 1$ and two groups of 4-bit zero flags Z4_0(1:2) and Z4_1(1:2), all of which are passed to the final adder multiplexer 26. The final adder multiplexer 26 has a 5-bit data output 36 (hereinafter referred to as the fourth data output), a 2-bit control signal $C_4 4(1:4)$ output and a flag output $Z_4 16$.

The carry select logic 28 receives a Gin signal and has a first output cnt_20 coupled to the first final adder multiplexer 20, a second output cnt_22 coupled to the second final adder multiplexer 22, a third output cnt_24 coupled to the third final adder multiplexer and a fourth output cnt_26 coupled to the fourth final adder multiplexer 26.

The normalisation part 4 comprises a first data multiplexer 38 coupled to receive the first, second, third and fourth data outputs 30, 32, 34, and 36 from the final adder multiplexers 20, 22, 24 and 26 respectively. The first data multiplexer 38 shifts the data it receives from the adder part 6 by a selectable multiple of 16 bits. In the preferred embodiment the shifts are 0, 16, 32 or 48 bits. The selection is made via a first decoder 44 in dependence on the first $Z_1 16$, second $Z_2 16$, and third $Z_3 16$ output flags received from the adder part 6. An output of the first data multiplexer 38 is coupled to a second data multiplexer 40.

The second data multiplexer 40 shifts the data it receives from the first data multiplexer 38 by a selectable multiple of 4 bits. In the preferred embodiment the shifts are 0, 4, 8 or 12 bits. The selection is made via a control multiplexer 46 and according to the first $C_1 4(1:4)$ second $C_2 4(1:4)$, third $C_3 4(1:4)$ and fourth $C_4 4(1:4)$ control signals received from the adder part 6. An output of the second data multiplexer 40 is coupled to a third data multiplexer 42.

The third data multiplexer 42 shifts the data it receives from the second data multiplexer 40 by a selectable number of bits: in the preferred embodiment the shifts are 0, 1, 2 or 3 bits. The selection is made via a second decoder 48 and in dependence on the position of the first '1' of the three Most Significant Bits (MSBs) of the output of the second data multiplexer 40. An output of the third data multiplexer 42 forms the first output 8 and therefore provides the normalised result.

The respective outputs of the first decoder 44, control multiplexer 46 and second decoder 48 are coupled to respective exponent logic 50, 52 and 54. The outputs of the exponent logic 50, 52 and 54 provide the binary value N for correction of the exponent value.

The operation of the mantissa addition system 2 in accordance with the present invention will now be described with reference to first adder unit 11.

The 16-bit adder 12 is divided into four sub-groups of four bits. For each one of the four sub-groups, two addition results are prepared: one result data_1 for the case when $C_{in}$ to the group is '1' and another result data_0 for the case when $C_{in}$ to the group is '0'. The adder 12 also generates a zero flag, for each one of the four sub-groups for both results, Z4_0 (Cin=0) and Z4_1 (Cin= 1). A zero flag is active ('1') if all the four bits in a group are '0' and the zero flag is inactive ('0') if any one of the four bits in a group is '1'. The two groups Z4_0(1:4) and Z4_(1:4) of zero flags are fed to their respective decoder 23 or 25.

The decoder 23 encodes the zero flags Z4_0(1:4) and provides a 4 bit output C4_0(1:4) according to Table 1 below.

TABLE 1

| Z4_0(1) | Z4_0(2) | Z4_0(3) | C4_0(1) | C4_0(2) | C4_0(3) | C4_0(4) |
|---|---|---|---|---|---|---|
| 0 | — | — | 1 | 0 | 0 | 0 |
| 1 | 0 | — | 0 | 1 | 0 | 0 |
| 1 | 1 | 0 | 0 | 0 | 1 | 0 |
| 1 | 1 | 1 | 0 | 0 | 0 | 1 |

The decoder 25 encodes the zero flags Z4_1(1:4) and provides a 4 bit output C4_1(1:4) also according to Table 1.

The adder 12 combines, for each of the two results, the four sub-groups of four bits to provide two groups of 16-bits data_0(1:16) and data_1(1:16) which are outputted to the final adder multiplexer. The carry output signal $C_{out0}$ represents the carry out signal for the addition result data_0(1:16) and the carry output signal $C_{out1}$ is the carry output for the addition result data_1(1:16).

Figure 3:
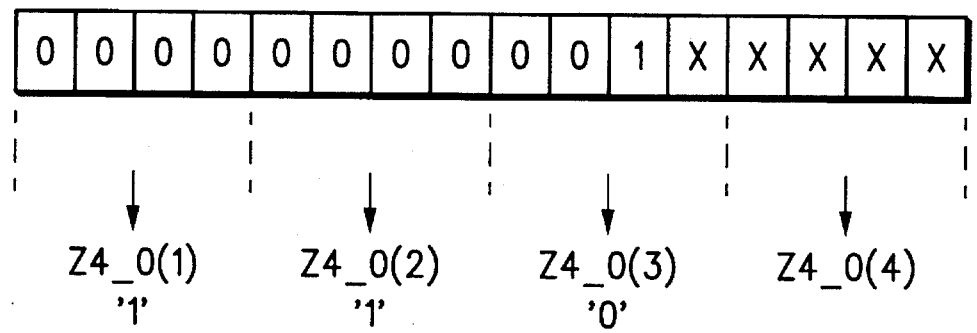
FIG. 3 is a representation of a 16-bit data result generated by one of the 16-bit adders of FIG. 1.

FIG. 3 represents a 16-bit result on the data output data_0 of first adder unit 11 and shows the corresponding zero flags, Z4_0(1), Z4_0(2), Z4_0(3) and Z4_0(4). In the example shown, Z4_0(1) and Z4_0(2) are active and Z4_0(3) is inactive.

Each of the two groups of four zero flags Z4_0(1:4) and Z4_1(1:4) are fed to AND gates 19 and 21 respectively. The two output flags Z16_0 and Z16_1 which result from ANDing the four zero flags in each group are outputted to final adder multiplexer 20. The output flag Z16_0 or Z16_1 is active ('1'), if all the zero flags in the respective group are active ('1'). Thus, for the example shown in FIG. 3, Z16_0 is inactive ('0').

The final adder multiplexer 20 therefore receives two groups of data and flags: data_0, C4_0(1:4) and Z16_0; and data_1, C4_1(1:4) and Z16_1.

The carry select logic 28 receives the $C_{in}$ signal of the adder part 6 and the two carry output signals $C_{out0}$ and $C_{out1}$ from each of the four adder units 11, 13, 15 and 17. $C_{out0\_12}$ is the carry output $C_{out}$ of the 16-bit adder 12 in the case when $C_{in}$ to the adder 12 is '0'. $C_{out1\_12}$ is the carry output $C_{out}$ of the 16-bit adder 12 in the case when $C_{in}$ to the adder 12 is '1'.

According to $C_{in}$ and the carry output signals received from the adder units, the carry select logic 28 generates four output signals cnt_20, cnt_22, cnt_24, and cnt_26 which are coupled to a respective one of the final adder multiplexers 20, 22, 24 and 26 to select one of the two groups of data and flags.

The output signals of the carry select logic 28 are as follows.

cnt_26=$C_{in}$ cnt_24=$C_{out0}\_18$+ ($C_{out1}\_18 \times C_{in}$)

cnt_22=$C_{out0}\_16$+ ($C_{out1}16 \times C_{out0}\_18$)+ ($C_{out1}\_16 \times C_{out1}\_18 \times C_{in}$)

cnt_20=$C_{out0}\_14$ +($C_{out1}\_14 \times C_{out0}\_16$)+ ($C_{out1}\_14 \times C_{out1}\_16 \times C_{out0}\_18$)+ ($C_{out1}\_14 \times C_{out1}\_16 \times C_{out1}\_18 \times C_{in}$)

Thus, in addition to one (data_0 or data_1) of the 16-bit data results being driven out of the first adder unit 11 on first data output 30, in response to the first output signal cnt_20, the corresponding flags are driven: one output flag $Z_1 16$ and four control signals $C_1 4(1:4)$.

It will be appreciated that the operation of the second, third and fourth adder units 13, 15 and 17 is identical to that described above with reference to the first adder unit 11. Thus, four groups of data and flags $Z_1 16$, $Z_2 16$ . . . and $C_1 4(1:4)$, $C_2 4(1:4)$, . . . , each group corresponding to the four adder units 11, 13, 15 and 17 are driven from the adder part 6 to the normalisation part 4.

Normalisation of the result driven from the adder part 6 is achieved using the three data multiplexers 38, 40, 42.

The first data multiplexer 38 shifts the data received from the adder part 6 in multiples of 16 bits as follows. The first decoder 44 decodes the three received output flags $Z_1 16$, $Z_2 16$, and $Z_3 16$ and generates an output signal C16(1:4), which indicates the appropriate number of 16-bit shifts, as shown in Table 2.

TABLE 2

| $Z_1 16$ | $Z_2 16$ | $Z_3 16$ | No. of Shifts left in 1st mux | $C_i 4(1:4)$ selected | N(1:2) |
|---|---|---|---|---|---|
| 0 | — | — | 0 | $C_1 4(1:4)$ | 00 |
| 1 | 0 | — | 16 | $C_2 4(1:4)$ | 01 |
| 1 | 1 | 0 | 32 | $C_3 4(1:4)$ | 10 |
| 1 | 1 | 1 | 48 | $C_4 4(1:4)$ | 11 |

The output signal C16(1:4) is coupled to the first data multiplexer 38. The received data is then shifted by the appropriate number of 16-bit shifts so that the 16-bit data group, which corresponds to the determined inactive output flag, becomes the most significant data group. For example, if the first output flag $Z_1 16$ of first adder unit 11 is inactive, no 16-bit shift is required since the corresponding 16-bit data is already the most significant data group. If the output flag $Z_3 16$ of the third adder unit 15 is inactive, the first data multiplexer 38 performs a 32-bit shift (i.e. 16×2).

The output signal C16(1:4) of the first decoder 44 is also fed to the control multiplexer 46 in order to select the group of control signals which corresponds to the first 16 bit group which is not all '0': that is, $C_1 4(1:4)$, $C_2 4(1:4)$, $C_3 4(1:4)$, or $C_4 4(1:4)$.

The second data multiplexer 40 shifts the data it receives from the first data multiplexer 38 by a selected multiple of 4 bits as follows. The control multiplexer 46 decodes the selected group of control signals $C_i4(1:4)$ and generates an output signal C4(1:4), which indicates the appropriate number of 4-bit shifts, as shown in Table 3.

TABLE 3

| $C_i4(1)$ | $C_i4(2)$ | $C_i4(3)$ | $C_i4(4)$ | No. of Shifts left in 2nd mux | N(3:4) |
|---|---|---|---|---|---|
| 1 | 0 | 0 | 0 | 0 | 00 |
| 0 | 1 | 0 | 0 | 4 | 01 |
| 0 | 0 | 1 | 0 | 8 | 10 |
| 0 | 0 | 0 | 1 | 12 | 11 |

The output signal C4(1:4) is coupled to the second data multiplexer 40. The second data multiplexer 40 then shifts the received data by an appropriate number of 4-bit shifts according to the output signal C4(1:4). The shifted data of the second data multiplexer 40 is then passed to the third data multiplexer 42 which shifts the received data by a selected number of bits as follows. The three MSBs (d1, d2 and d3) of the most significant sub-group are decoded by decoder 48. The decoder 48 detects the position of the leading '1' and sends a signal representing the position of the leading '1' to the third data multiplexer 42. The third data multiplexer 42 then shifts the received data by an appropriate number of bits so that the leading '1' becomes the MSB as shown in Table 4.

TABLE 4

| d1 | d2 | d3 | No. of Shifts left in 3rd mux | N(5:6) |
|---|---|---|---|---|
| 1 | — | — | 0 | 00 |
| 0 | 1 | — | 1 | 01 |
| 0 | 0 | 1 | 2 | 10 |
| 0 | 0 | 0 | 3 | 11 |

The output 8 of third data multiplexer 42 therefore provides the normalised result of an addition operation performed on the two mantissas of two floating point numbers by the adder part 6.

The overall number of shifts required to normalise the mantissa addition result is encoded in the N(1:6) binary value which is obtained by encoding the number of shifts performed by each of three data multiplexers 38, 40 and 42 using the exponent logic 50, 52 and 54 respectively. Each pair of the N(1:6) bits is the simple logic of the corresponding outputs from the decoder 44, control multiplexer 46 and decoder 48 (see Tables 2, 3 and 4): the first pair of bits N(1:2) corresponds to the number of 16 bit shifts performed by the first data multiplexer 38, the second pair of bits N(3:4) corresponds to the number of 4 bit shifts performed by the second data multiplexer 40 and the third pair of bits N(5:6) corresponds to the number of bit shifts performed by the third data multiplexer 42.

In summary, the mantissa addition system in accordance with the present invention performs an addition operation on two mantissas and provides a normalised result together with a binary value of the number of shifts required to normalise the result. Unlike the known normalisation sequences, the invention performs part of the 'find the leading one' step in parallel with the addition operation in the adder part by generating zero flags. Thus, when the adder's result is generated, partial information about the normalisation shift is already available. This significantly reduces the delay between the input and the output of the mantissa addition system.

The zero flag generation does not delay the generation of the adder's result and requires very little area to implement. The generation of the zero flags $Z4\_0(1:4)$, $Z4\_1(1:4)$, and control signals C4(1:4) and the output flags Z16 ensure that the generation of the data multiplexer's shift control is very simple and quick. Furthermore, since only three data multiplexers are required to normalise the result, small area is required for normalisation.

A further advantage of the mantissa addition system in accordance with the invention lies in the fact that the encoding of the number of shifts required to correct the exponent is very simple, quick and requires small area to implement since the information is readily available from the flag outputs $Z_116$, $Z_216$ ... and control signals $C_14(1:4)$, $C_24(1:4)$, ....

Thus, the invention provides fast normalisation of the mantissas adder's result but requires very little additional area to implement.

We claim:

1. A mantissa addition system for providing a normalized addition result for two mantissas and information indicating the number of bit shifts required to provide the normalized addition result, the system comprising:

mantissa adder means for adding two mantissas to provide an addition resultant group, the addition resultant group comprising a plurality of bits arranged in a predetermined number of sub-groups of bits;

flag generating means for generating a flag for each sub-group of the predetermined number of sub-groups, the flag having an active state when all the bits in a respective sub-group are zero and an inactive state when at least one of the bits in the respective sub-group is non-zero; and mantissa normalisation means coupled to the mantissa adder means and the flag generating means, the mantissa normalisation means comprising:

first detecting means for detecting a most significant flag having the inactive state and for providing a first control signal representative of the detected most significant flag;

first shifting means for shifting the groups of bits of the addition result in response to the first control signal so that the sub-group of bits corresponding to the detected most significant flag is the most significant group, the first shifting means providing a first shifted addition result;

second detecting means for detecting the most significant bit of the most significant sub-group of the first shifted addition result which is non-zero and for providing a second control signal representative of the detected most significant bit;

second shifting means for shifting the plurality of bits of the first shifted addition result in response to the second control signal so that the detected most significant non-zero bit is the most significant bit, the second shifting means providing a second shifted addition result which represents the normalised addition result; and logic means for providing the shift information in dependence on the number of shifts performed by the first and second shifting means.

2. The mantissa addition system according to claim 1 wherein the first and second detecting means are coupled to the logic means to provide the first and second control signals thereto, wherein the logic means comprises:

first logic means for generating in response to the first control signal a first binary value indicating the number of shifts performed by the first shifting means; and second logic means for generating in response to the second control signal a second binary value indicating the number of shifts performed by the second shifting means; and combining means for combining the first and second binary values to provide the shift information.

3. The mantissa addition system according to claim 2 wherein the predetermined number of sub-groups of bits are arranged in a number of groups, each group comprising at least one sub-group of bits, and wherein the mantissa addition system further comprises:

flag logic means for each group, each flag logic means being coupled to receive the flag of each sub-group in the respective group, each flag logic means logically combining the flags in the respective group so as to provide a flag output signal to the mantissa normalisation means having an active state when all of the flags in the respective group have the active state and an inactive state when at least one of the flags in the respective group has an inactive state, and wherein the mantissa normalisation means further comprises:

third detecting means for detecting the most significant flag output signal having the inactive state and for providing a third control signal representative of the detected most significant flag output signal;

third shifting means coupled to receive the addition result from the mantissa adder means for shifting the groups of sub-groups of the addition result in response to the third control signal so that the group corresponding to the detected most significant flag output signal is the most significant group, the third shifting means having an output for providing a shifted addition result to the first shifting means to be shifted therein so as to provide the first shifted addition result and wherein the logic means provides the shift information in dependence on the number of shifts performed by the first, second and third shifting means and wherein the third detecting means is coupled to the logic means to provide the third control signal thereto the logic means further comprising third logic means for generating in response to the third control signal a third binary value indicating the number of shifts performed by the third shifting means and wherein the combining means combines the first, second and third binary values to provide the shift information.

4. The mantissa addition system according to claim 1 wherein the predetermined number of sub-groups of bits are arranged in a number of groups, each group comprising at least one sub-group of bits, and wherein the mantissa addition system further comprises:

flag logic means for each group, each flag logic means being coupled to receive the flag of each sub-group in the respective group, each flag logic means logically combining the flags in the respective group so as to provide a flag output signal to the mantissa normalisation means having an active state when all of the flags in the respective group have the active state and an inactive state when at least one of the flags in the respective group has an inactive state, and wherein the mantissa normalisation means further comprises:

third detecting means for detecting the most significant flag output signal having the inactive state and for providing a third control signal representative of the detected most significant flag output signal;

third shifting means coupled to receive the addition result from the mantissa adder means for shifting the groups of sub-groups of the addition result in response to the third control signal so that the group corresponding to the detected most significant flag output signal is the most significant group, the third shifting means having an output for providing a shifted addition result to the first shifting means to be shifted therein so as to provide the first shifted addition result and wherein the logic means provides the shift information in dependence on the number of shifts performed by the first, second and third shifting means.

5. The mantissa addition system according to claim 3 wherein the third detecting means is coupled to the first detecting means to provide the third control signal thereto, and the first detecting means, in response to the third control signal, selects the flags of the group corresponding to the detected most significant flag output signal and detects the most significant flag of the selected flags having the inactive state and provides the first control signal in response thereto.

6. The mantissa addition system according to claim 1 wherein the mantissa adder means comprises:

at least one carry select adder for generating first and second addition results, wherein each of the first and second addition results comprising a plurality of bits arranged in the predetermined number of sub-groups of bits, and the first result corresponding to a zero carry output signal and the second result corresponding to a non-zero carry output signal, and wherein the flag generating means generates a first set of flags for each sub-group of the first addition result and a second set of flags for each sub-group of the second addition result; and select logic means coupled to receive the carry output signal from the at least one carry select adder and having an output for providing a select signal to the at least one carry select adder and to the flag generating means, the select signal having a value dependent on the carry output signal, such that one addition result of the first and second addition results and the respective first or second sets of flags are selected in response to the value of the select signal.

7. A method of providing a normalised result of an addition operation for two mantissas and information which indicates the number of bit shifts required to provide the normalised addition result, the method comprising the steps of:

adding two mantissas to provide an addition resultant group which comprises a plurality of bits arranged in a predetermined number of sub-groups of bits generating a flag for each sub-group of the predetermined number of sub-groups, each flag having an active state when all the bits in the respective sub-group are zero and an inactive state when at least one of the bits in the respective sub-group is non-zero;

detecting the most significant flag having the inactive state and providing a first control signal representative of the detected most significant flag;

shifting the groups of bits of the addition result in response to the first control signal to provide a first shifted addition result wherein the sub-group of bits corresponding to the detected most significant flag is the most significant group;

detecting the most significant bit of the most significant sub-group of the first shifted addition result which is non-zero and providing a second control signal representative of the detected most significant bit;

shifting the plurality of bits of the first shifted addition result in response to the second control signal to provide a second shifted addition result which represents the normalised addition result wherein the detected most significant non-zero bit is the most significant bit; and providing the shift information in dependence on the number of shifts performed by the shifting steps.

8. The method according to claim 7 wherein the predetermined number of sub-groups of bits are arranged in a number of groups, each group comprising at least one sub-group of bits, wherein the method further comprises, before the most significant flag detecting step, the steps of:

logically combining the flags of each sub-group in the respective group so as to provide a flag output signal having an active state when all of the flags in the respective group have the active state and an inactive state when at least one of the flags in the respective group has an inactive state; and detecting the most significant flag output signal having the inactive state by detecting the most significant flag of the group corresponding to the detected most significant flag output signal providing a third control signal representative of the detected most significant flag output signal;

shifting the groups of sub-groups of the addition result in response to the third control signal so that the group corresponding to the detected most significant flag output signal is the most significant group;

providing the shifted addition result to be shifted in response to the first control signal; and adding the number of shifts performed by the group shifting step to the shift information.

* * * * *